UNITED STATES PATENT OFFICE.

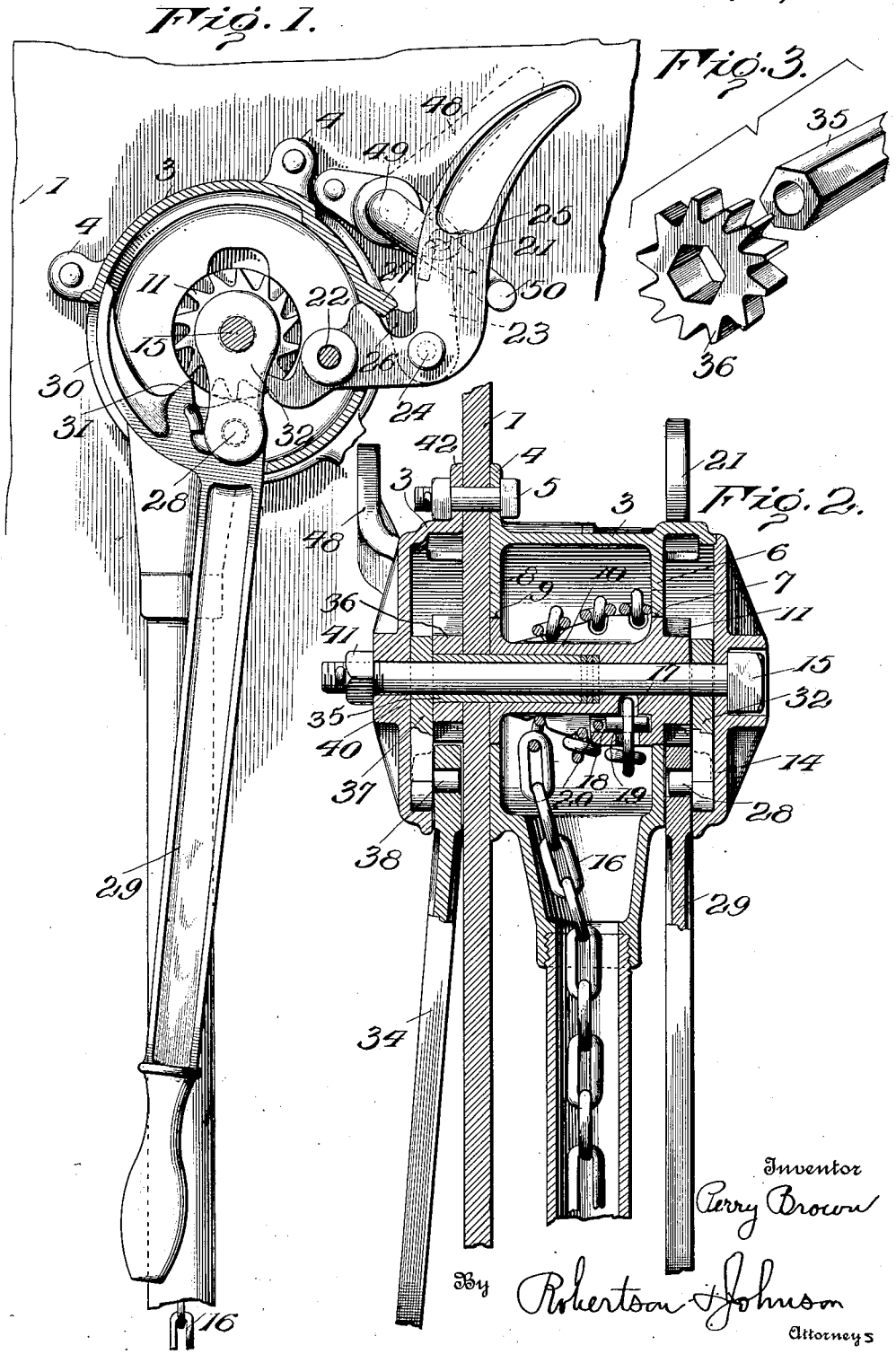

PERRY BROWN, OF CORAOPOLIS, PENNSYLVANIA; MARGARET J. BROWN EXECUTRIX OF SAID PERRY BROWN, DECEASED.

HAND-BRAKE FOR RAILWAY-CARS.

1,340,322.   Specification of Letters Patent.   Patented May 18, 1920.

Application filed November 14, 1916. Serial No. 131,317.

*To all whom it may concern:*

Be it known that I, PERRY BROWN, a citizen of the United States, and a resident of Coraopolis, in the county of Allegheny and State of Pennsylvania, have invented certain new and useful Improvements in Hand-Brakes for Railway-Cars, of which the following is a specification.

This invention relates to a brake for railway cars and more particularly to hand operated brakes. The object of the invention is to so construct the brake that it can be operated from both sides of the wall of a car and in such a manner that if the brake should be applied by any one standing on the outside of the car, it could be subsequently released by one located within the car, and vice versa. Another object of my invention is to provide a brake of this character which can be used on cars where the end walls may be of varying thicknesses so that one standard brake may be fitted to different makes of cars.

The invention relates to the brake shown, in its preferable embodiment, in the drawings accompanying and forming part hereof, and the brake will now be hereinafter described and claimed.

In the aforesaid drawings:

Figure 1 is a side elevation, with parts in section, of a brake constructed in accordance with my invention.

Fig. 2 is a vertical central section.

Fig. 3 is a perspective view of two details.

Referring now to the details of the drawings by numerals: 1 represents, in conventional form, the end wall of a car to which my brake is applied. The main part of the brake may, if desired, be similar to the construction of the brake shown, for example, in my United States Patents Nos. 1,185,974 and 1,185,977, see particularly the latter. If a brake of this particular type is employed, it consists preferably of a casing 3 having lugs 4 which afford a means by which the casing may be secured to the end of the car by suitable bolts 5, as illustrated in Figs. 1 and 2. The casing is preferably open at the front end and is provided with a divisional wall 6 having a central aperture 7. The back wall 8 of the casing is provided with a similar aperture 9 and these apertures 7 and 9 provide bearings for a drum 10 having ratchet teeth forming a ratchet wheel 11 preferably cast integral therewith. The construction is such that the drum 10 with its ratchet wheel 11 may be inserted in position through the opening 7 in the wall 6 until it is in the position shown in Fig. 2. At the front end of the casing I provide a cover 14 and a bolt 15 passes through the cover and through an opening in the drum 10, the free end of the bolt passing through the end wall 1 of the car, as illustrated. A brake chain 16 is secured in any desirable way to the drum, but I prefer to make this drum of the shape shown in Fig. 2. As there shown, one end is larger than the other and is provided with a recess 17 to receive the first link of the chain, the drum also having a second recess 18 at right angles to the recess 17 through which a roller 19 is inserted which passes through the first link of the chain, and thereby secures the chain to the drum. A cotter or pin 20 is employed to hold the roller 19 from slipping out of position. The drum is tapering in shape, as illustrated in Fig. 2, so that when the brake is first applied the chain will be wound around the larger diameter of the drum and afterward when more power is required, the drum tapers off to a smaller diameter. Between the front wall 6 and the cover 14 is pivoted a dog 21 which may be similar to that shown in my aforesaid patents, the inner end of this dog co-acting with the aforesaid ratchet wheel 11 to prevent counter-rotation, and the outer end extends outside of the casing and forms a weight to hold the dog in operative engagement with said ratchet wheel. It will be obvious that by moving the free end of the dog 21 upwardly, as shown in Fig. 1, the dog will be released from the ratchet wheel so that the latter may rotate. At the same time as the ratchet wheel is rotated in the manner hereinafter described, the teeth will move the dog on its pivot 22 as the ratchet wheel is moved tooth by tooth. It is desirable to sometimes lock the dog 21 so that it cannot be accidentally or otherwise thrown upward to release the brake. To enable the brakeman to lock the dog 21, I attach a lock or latch 23 to the dog 21 by means of a pivotal pin 24. This lock or latch has a finger piece 25 by which the lock may be moved on its pivot, and it is also provided with a lug 26 which, when moved to the position shown in Fig. 1, projects against a lug 27 on the casing 3 and prevents the dog from being moved to release the ratchet wheel. When it is desired to unlock the holding dog the operator merely moves the finger piece 25 in the direction of the arrow shown in Fig. 1, so as to free the lug 26 from the lug 27, when the handle of the dog may be moved upwardly and thereby release the brake.

Supported on the bolt 15, preferably alongside of the ratchet wheel 11 is a link 32 which may be identical with the link shown in my aforesaid patents, and therefore this link has a pin or stud 28 upon which is supported the operating lever or handle 29. This handle works through an opening 30 in the casing 3 and the handle is provided with a pawl 31 which, when the handle hangs by gravity in the position shown in Fig. 1, is normally free from the ratchet wheel 11 and therefore inactive, but as soon as the handle is swung on its pivot 28 said pawl 31 engages the ratchet teeth in a manner well understood. As in my aforesaid patents, when it is desired to apply the brake, the handle or lever 29 is operated very much as one would operate a pump handle. Hence on the upward movement of the handle 29, as it is moved through the slot 30, its pawl 31 is first moved in contact with ratchet wheel 11 and then as the handle is swung around in the casing on the link 32 which hangs from the bolt 15, the ratchet wheel 11 is rotated as far as the lever or handle is moved, the dog 21 being moved in and out, tooth by tooth, as the ratchet wheel 11 is rotated. When the handle is released it drops by gravity to the position shown in Fig. 1 and becomes inactive, the dog 21 holding the ratchet wheel from counter-rotation. The brake as thus described may be applied to the end of a car but in order that the brake may be used on both sides of the car I provide the following mechanism. On the opposite side of the car, I secure a second operating handle 34 by which the brake may be operated from the inside of the car in the same manner just described with reference to the handle 29 on the outside of the car. To this end I form the drum with an opening in its free end to receive a sleeve 35 (see Fig. 3) which is preferably hexagonal in shape so that when said sleeve is inserted in the opening in the drum 10, around the bolt 15, said sleeve must of necessity rotate with said drum. On the free end of the sleeve is secured a ratchet wheel 36 which has an opening to fit over the hexagonal end of the sleeve 35, as seen in Fig. 3. A link 37 is employed identical with the link 32 on the other side of the brake, this link being provided with a pin or stud 38 similar to the pin or stud 28. The handle 34 and its accompanying parts are identical with the handle and accompanying parts on the opposite end of the brake. The free end of the bolt 15 passes through a cover or casing 40 which is secured in position by the bolt 41 and is also secured to the end of the car by means of the bolts 5 passing through lugs 42 similar to the lugs 4 hereinbefore referred to. Inasmuch as the sleeve 35 is telescopically secured to the drum 10, it follows that this brake may be applied to car ends of different thicknesses. Thus, if the end wall 1, illustrated in Fig. 2, is twice as thick as that shown, the sleeve 35 will readily accommodate itself to that or to any other desired thickness of end wall. The dog 21 may be operated from the inside of the car by means of a handle 48 projecting from a rock shaft 49 having a crank 50 projecting in the path of the dog 21. Thus the brakeman may operate the dog 21 by lifting it with his hand, if on one side of the car, and if on the inside of the car, he may lift the handle 48 and through the rock shaft 49 and the crank 50 the dog may be released on the other side of the car.

From the foregoing and accompanying drawings, it will be seen that I have provided a brake which may be readily secured to opposite sides of a car wall and be operated from either side. It will also be seen that the brake may be standardized so as to be secured to cars having end walls of greater or less thickness.

What I claim as my invention is:

1. In a brake, the combination of a casing, a ratchet wheel in said casing, a braking member operated from said ratchet wheel, means for rotating said ratchet wheel comprising a handle projecting out of said casing, a dog having a portion thereof entering the casing and co-acting with the ratchet wheel to hold the same from counter-rotation and provided with a handle extending outside of the casing, and a lock or latch pivotally supported by said dog and movable into position to lock said dog into engagement with the ratchet wheel within the casing.

2. In a brake, the combination of a ratchet wheel, a braking member operated therefrom, means for rotating said ratchel wheel, a dog co-acting with said ratchet wheel to prevent counter-rotation, and a lock or latch pivotally connected with said dog and movable to co-act with the casing of the brake to lock said dog into engagement with said ratchet wheel.

3. In a brake, a casing, a drum therein having a ratchet wheel rotating therewith, a handle for operating said drum and ratchet wheel, a dog for holding said drum from counter-rotation, and a lock or latch pivotally supported by said dog and movable against said casing whereby said dog is locked into engagement with said ratchet wheel.

4. In a brake, a car wall, a brake operating device located on one side of said wall and comprising a chain drum also on one side of said wall with an opening in one of its ends, ratchet teeth on the other end of said drum, a handle normally hanging in an inactive position and having a pawl engaging with said ratchet teeth when said handle is moved upwardly, a member projecting through said wall and into the opening in the aforesaid chain drum, ratchet teeth on the end of said member and located on the opposite side of said wall, and operating means co-acting with the last mentioned teeth to rotate said drum.

5. In a brake, a car wall, a brake operating device located on one side of said wall and comprising a chain drum also on one side of said wall with an opening in one of its ends, ratchet teeth on the other end of said drum, a handle normally hanging in an inactive position and having a pawl engaging with said ratchet teeth when said handle is moved upwardly, a member projecting through said wall and into the opening in the aforesaid chain drum, ratchet teeth on the end of said member and located on the opposite side of said wall, operating means co-acting with the last mentioned teeth to rotate said drum, a dog for holding said drum from counter-rotation, and means operable from both sides of said wall for releasing said dog.

6. In a brake, a car wall, a brake operating device located on one side of said wall and comprising a chain drum also on one side of said wall with an opening in one of its ends, ratchet teeth on the other end of said drum, a handle normally hanging in an inactive position and having a pawl engaging with said ratchet when said handle is moved upwardly, a member projecting through said wall and into the opening in the aforesaid chain drum, ratchet teeth on the end of said member and located on the opposite side of said wall, and a handle normally hanging in an inactive position and having a pawl engaging said ratchet teeth when said handle is moved upwardly whereby said drum may be independently operated by either of said handles.

7. In a brake, a car wall, a brake operating device located on one side of said wall and comprising a chain drum also on one side of said wall with an opening in one of its ends, ratchet teeth on the other end of said drum, a handle normally hanging in an inactive position and having a pawl engaging with said ratchet teeth when said handle is moved upwardly, a member projecting through said wall and into the opening in the aforesaid chain drum, ratchet teeth on one end of said member and located on the opposite side of said wall, a handle normally hanging in an inactive position and having a pawl engaging said ratchet teeth when said handle is moved upwardly whereby said drum may be independently operated by either of said handles, and a dog operable from both sides of said car wall for holding said drum from counter-rotation.

In testimony whereof I affix my signature in presence of two witnesses.

PERRY BROWN.

Witnesses:
JOHN L. FLETCHER,
THOMAS E. ROBERTSON.